(12) United States Patent
Bar Bracha et al.

(10) Patent No.: US 10,205,548 B2
(45) Date of Patent: Feb. 12, 2019

(54) APPARATUS, METHOD AND SYSTEM OF COMMUNICATING ACOUSTIC INFORMATION OF A DISTRIBUTED MICROPHONE ARRAY BETWEEN MOBILE DEVICES

(71) Applicant: INTEL IP CORPORATION, Santa Clara, CA (US)

(72) Inventors: Vered Bar Bracha, Hod HaSharon (IL); Amihai Kidron, Karkur (IL); Peter Kroon, Green Brook, NJ (US)

(73) Assignee: INTEL IP CORPORATION, Santa Clara, CA (US)

( * ) Notice: Subject to any disclaimer, the term of this patent is extended or adjusted under 35 U.S.C. 154(b) by 222 days.

(21) Appl. No.: 15/243,310

(22) Filed: Aug. 22, 2016

(65) Prior Publication Data

US 2016/0359577 A1 Dec. 8, 2016

Related U.S. Application Data

(63) Continuation of application No. 14/325,913, filed on Jul. 8, 2014, now Pat. No. 9,451,361.

(51) Int. Cl.
*H04J 3/06* (2006.01)
*H04M 3/56* (2006.01)
*H04R 3/00* (2006.01)

(52) U.S. Cl.
CPC ............ *H04J 3/0661* (2013.01); *H04M 3/56* (2013.01); *H04R 3/005* (2013.01); *H04R 2420/07* (2013.01); *H04R 2499/11* (2013.01)

(58) Field of Classification Search
CPC .......................................... G05B 2219/25054

USPC .......... 370/350, 503, 507, 312; 379/406.06; 348/14.08; 713/502; 375/134; 381/77; 368/73
See application file for complete search history.

(56) References Cited

U.S. PATENT DOCUMENTS

| 5,519,717 A * | 5/1996 | Lorenzo ............... H04B 1/7156 375/134 |
| 8,462,961 B1 * | 6/2013 | Bywaters ............ H04L 12/1895 381/77 |
| 9,451,361 B2 | 9/2016 | Bar Bracha et al. |
| 2005/0041529 A1 | 2/2005 | Schliep et al. |
| 2007/0159924 A1 | 7/2007 | Vook et al. |
| 2009/0199037 A1 * | 8/2009 | Venkatesh ................. G06F 1/12 713/502 |
| 2012/0155497 A1 * | 6/2012 | Lee ....................... H04J 3/0697 370/507 |

(Continued)

OTHER PUBLICATIONS

Golan et al., "Blind Sampling Rate Offset Estimation and Compensation in Wireless Acoustic Sensor Networks With Application to Beamforming", International Workshop on Acoustic Signal Enhancement 2012, Sep. 4-6, 2012, Aachen, 4 pages.

(Continued)

*Primary Examiner* — Md S Elahee
(74) *Attorney, Agent, or Firm* — Shichrur & Co.

(57) ABSTRACT

Some demonstrative embodiments include devices, systems and methods of communicating acoustic information of a distributed microphone array between mobile devices. For example, an audio processor may determine source information of one or more acoustic sources based on acoustic information sensed by a distributed microphone array including a first microphone of a first mobile device and a second microphone of a second mobile device.

23 Claims, 8 Drawing Sheets

(56) References Cited

U.S. PATENT DOCUMENTS

| | | | |
|---|---|---|---|
| 2013/0077554 A1* | 3/2013 | Gauvreau | H04L 5/001 370/312 |
| 2014/0009564 A1* | 1/2014 | Cleve | H04M 3/002 348/14.08 |
| 2014/0112466 A1* | 4/2014 | Bao | H04M 9/082 379/406.06 |
| 2014/0171100 A1 | 6/2014 | Marti et al. | |
| 2014/0219269 A1* | 8/2014 | Vleugels | G06F 5/16 370/350 |
| 2014/0269223 A1* | 9/2014 | Mokhnatkina | G04G 13/02 368/73 |
| 2014/0314251 A1 | 10/2014 | Rosca et al. | |
| 2014/0371631 A1 | 12/2014 | Fontana | |
| 2015/0168538 A1 | 6/2015 | Bradley et al. | |
| 2017/0123069 A1* | 5/2017 | Kotab | G01S 19/13 |

OTHER PUBLICATIONS

Markovich et al., "Multichannel Eigenspace Beamforming in a Reverberant Noisy Environment with Multiple Interfering Speech Signals", IEEE Transactions on Audio, Speech and Language Processing, vol. XX, No. Y, Month 2008, 31 pages.

Golan et al., "Subspace Tracking of Multiple Sources and Its Application to Speakers Extraction", ICASSP 2010, 4 pages.

Wi-Fi Alliance Technical Committee P2P Task Group, Wi-Fi Peer-to-Peer (P2P) Technical Specification, Version 1.2, Dec. 14, 2011, 160 pages.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

IEEE Std 802.111™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

Specification of the Bluetooth System, Version 1.0 B, Dec. 1, 1999, 1082 pages.

Specification of the Bluetooth System Experience More, Covered Core Package version: 4.0, Jun. 30, 2010, 2302 pages.

Office Action for U.S. Appl. No. 14/325,913, dated Feb. 2, 2016, 16 pages.

* cited by examiner

APPARATUS, METHOD AND SYSTEM OF COMMUNICATING ACOUSTIC INFORMATION OF A DISTRIBUTED MICROPHONE ARRAY BETWEEN MOBILE DEVICES

TECHNICAL FIELD

Embodiments described herein generally relate to communicating acoustic information of a distributed microphone array between mobile devices.

BACKGROUND

Microphone arrays may be utilized to enhance processing of acoustic information, for example, to enhance speech quality during a teleconference, e.g., by filtering out background noise.

Existing microphone array implementations are configured to process information of a static array of microphone elements. For example, the microphone array may be calibrated with respect to a specific configuration of the microphone elements.

For example, "*Multichannel Eigenspace Beamforming in a Reverberant Noisy Environment with Multiple Interfering Speech Signals*", S. Markovich, S. Gannot and I. Cohen, *IEEE Transactions on Audio, Speech and Language Processing*, Volume 17, Issue 6, pp. 1071-1086, August 2009 describes a Linearly Constrained Minimum Variance (LCMV) beamformer configured to extract desired speech signals from multi-microphone measurements. In *"Subspace Tracking of Multiple Sources and its Application to Speakers Extraction"*, S. Markovich-Golan, S. Gannot, and I. Cohen, *The IEEE International Conference on Acoustics, Speech and Signal Processing (ICASSP)*, Dallas, Tex., USA, March, 2010, the LCMV beamformer was extended to extract desired speech signals uttered by moving speakers contaminated by competing speakers and stationary noise in a reverberant environment. The article "*Blind Sampling Rate Offset Estimation and Compensation in Wireless Acoustic Sensor Networks with Application to Beamforming*", S. Markovich-Golan, S. Gannot and I. Cohen, *International Workshop on Acoustic Signal Enhancement (IWAENC)*, Aachen, Germany, September 2012, uses a blind procedure for estimating sampling rate offsets between acoustic sensor nodes, and shows that a clock drift as low as 300 ppm may deteriorate beamformer performance significantly, thereby rendering distributed structures useless.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
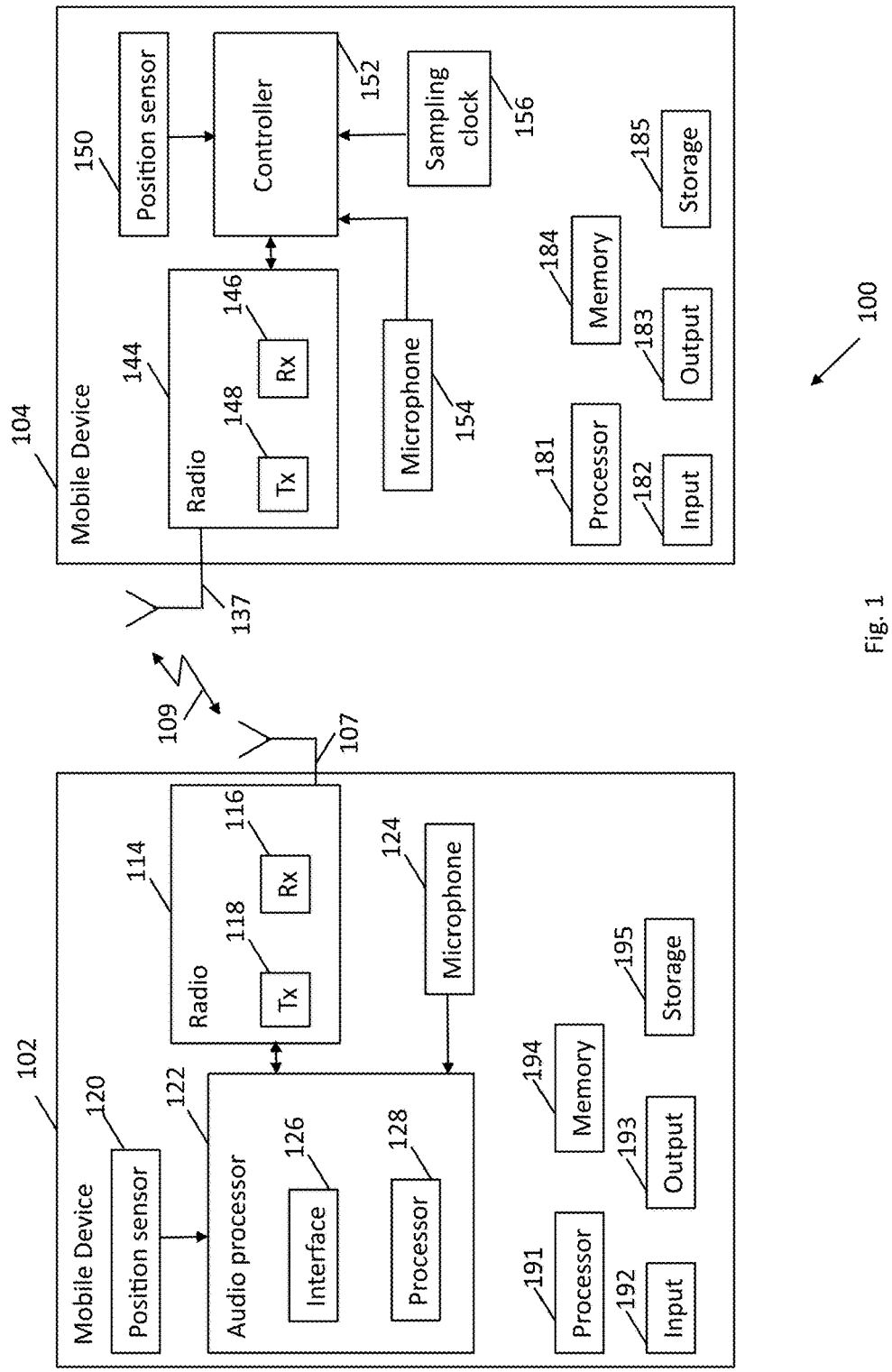
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a mobile or portable device, an Internet of Things (IoT) device, a wearable device, a handheld device, a User Equipment (UE), an Ultrabook™, a mobile computer, a laptop computer, a notebook computer, a tablet computer, a handheld computer, a Personal Digital Assistant (PDA) device, a handheld PDA device, an on-board device, an off-board device, a hybrid device, a vehicular device, a non-vehicular device, a consumer device, a wireless communication station, a wireless communication device, a video device, an audio device, an audio-video (A/V) device, a wireless network, a wireless area network, a Wireless Video Area Network (WVAN), a Wireless LAN (WLAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; IEEE802.11 task group ac (TGac) (*"IEEE802.11-09/ 0308r12—TGac Channel Model Addendum Document"*); IEEE 802.11 task group ad (TGad) (*IEEE P802.11ad-2012, IEEE Standard for Information Technology—Telecommunications and Information Exchange Between Systems—Local and Metropolitan Area Networks—Specific Requirements— Part 11: Wireless LAN Medium Access Control (MAC) and Physical Layer (PHY) Specifications—Amendment 3: Enhancements for Very High Throughput in the 60 GHz Band*, 28 Dec. 2012)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (*WiFi P2P technical specification*, version 1.2, 2012) and/or future versions and/or derivatives thereof, devices and/or networks operating in accordance with existing Bluetooth standards, e.g., including "*Bluetooth specification V* 1.0", Dec. 1, 1991, *"Bluetooth specification V* 4.0", Jun. 30, 2010, and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other wired and/or wireless devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

In some demonstrative embodiments, system 100 may include one or more mobile devices, e.g., mobile devices 102 and 104, capable of communicating over at least one wireless communication medium.

In some demonstrative embodiments, device 102 may include one or more radios 114, and/or device 104 may include one or more radios 144, to perform communication between wireless communication devices 102 and/or 104 and/or with one or more other devices, e.g., as described below.

In some demonstrative embodiments, radios 114 and/or 144 may be capable of communicating content, data, information and/or signals over the wireless communication medium, for example, via a radio channel, a RF channel, a Wireless Fidelity (WiFi) channel, an IR channel, a Bluetooth (BT) Channel, a cellular channel, and the like. For example, radios 114 and/or 144 including, for example, one or more wireless transmitters, receivers and/or transceivers able to send and/or receive wireless communication signals, RF signals, frames, blocks, transmission streams, packets, messages, data items, and/or data.

In one example, radio 114 may include at least one Transmitter (Tx) 118 and at least one Receiver (Rx) 116; and/or radio 144 may include at least one Transmitter (Tx) 148 and at least one Receiver (Rx) 146.

In some demonstrative embodiments, radios 114 and/or 144 may include or may be implemented as part of a wireless Network Interface Card (NIC), and the like.

In some demonstrative embodiments, mobile devices 102 and 104 may include, or may be associated with, one or more antennas 107 and 137, respectively. Antennas 107 and/or 137 may include any type of antennas suitable for transmitting and/or receiving wireless communication signals, blocks, frames, transmission streams, packets, messages and/or data. For example, antennas 107 and/or 137 may include any suitable configuration, structure and/or arrangement of one or more antenna elements, components, units, assemblies and/or arrays. Antennas 107 and/or 137 may include an antenna covered by a quasi-omni antenna pattern. For example, antennas 107 and/or 137 may include at least one of a phased array antenna, a single element antenna, a set of switched beam antennas, and the like. In some embodiments, antennas 107 and/or 137 may implement transmit and receive functionalities using separate transmit and receive antenna elements. In some embodiments, antennas 107 and/or 137 may implement transmit and receive functionalities using common and/or integrated transmit/receive elements.

In some demonstrative embodiments, mobile devices 102 and 104 may include or may be implemented as part of a mobile computer, a laptop computer, a notebook computer, a tablet computer, an Ultrabook™ computer, a mobile internet device, a portable computer, a wearable device, e.g., a smart watch, smart glasses or a headset, an Internet of Things (IoT) device, a handheld computer, a handheld device, a personal device, a mobile phone, a Smartphone, a PDA device, a handheld PDA device, an on-board device, an off-board device, a consumer device, a vehicular device, a non-vehicular device, a portable device, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a video device, an audio device, an A/V device, a gaming device, a media player, or the like.

In some demonstrative embodiments, device 102 may include, for example, one or more of a processor 191, an input unit 192, an output unit 193, a memory unit 194, and a storage unit 195, and/or device 104 may include, for example, one or more of a processor 181, an input unit 182, an output unit 183, a memory unit 184, and a storage unit 185. Devices 102 and/or 104 may optionally include other suitable hardware components and/or software components. In some demonstrative embodiments, some or all of the components of one or more of devices 102 and/or 104 may be enclosed in a common housing or packaging, and may be interconnected or operably associated using one or more wired or wireless links. In other embodiments, components of one or more of devices 102 and/or 104 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 104 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 104.

In some demonstrative embodiments, mobile device 102 may include at least one microphone 124. In one example, mobile device 102 may include a single microphone 124. In another example, mobile device 102 may include a plurality of microphones 124, e.g., in the form of an array of two or more microphones. For example, mobile device 102 may include a front microphone on a front side of mobile device 102, a backside microphone on a backside of mobile device 102, and/or any other additional alternative or additional microphones at any other arrangement.

In some demonstrative embodiments, input unit 192 may include microphone 124. In other embodiments, input unit 192 and microphone 124 may be implemented as separate elements of mobile device 104.

In some demonstrative embodiments, mobile device 104 may include at least one microphone 154. In one example, mobile device 104 may include a single microphone 154. In another example, mobile device 104 may include a plurality of microphones 154, e.g., in the form of an array of two or more microphones. For example, mobile device 104 may include a front microphone on a front side of mobile device 104, a backside microphone on a backside of mobile device 104, and/or any other additional alternative or additional microphones at any other arrangement.

In some demonstrative embodiments, input unit 182 may include microphone 154. In other embodiments, input unit 182 and microphone 154 may be implemented as separate elements of mobile device 104.

The term "microphone" as used herein may refer to any acoustic sensor configured to sense acoustic signals and/or waves.

In some demonstrative embodiments, mobile devices 102 and 104 may be configured to form and/or communicate as part of a wireless communication network 109.

In some demonstrative embodiments, wireless communication network 109 may include an ad-hoc network.

In some demonstrative embodiments, wireless communication network 109 may include a Wireless Personal Area Network (WPAN).

In other embodiments, wireless communication network 109 may include any other wireless communication network.

Some demonstrative embodiments may enable to operate microphones of a plurality of mobile devices, e.g., mobile devices 102 and 104, in a collaborative manner, for example, as a distributed microphone array, e.g., to enhance acoustic processing of acoustic signals sensed by the microphones.

For example, the distributed microphone array formed by the microphones of the plurality of mobile devices may be utilized to enhance speech quality, e.g., to filter out background noise and/or interference, to separate simultaneous speakers, and/or to perform any other processing of acoustic information sensed by the distributed microphone array.

In one example, the distributed microphone array formed by the microphones of the plurality of mobile devices may be utilized to enhance acoustic processing for human-to-human communications, e.g., during a telephonic conversation, a conference call, and the like.

In another example, the distributed microphone array formed by the microphones of the plurality of mobile devices may be utilized to enhance acoustic processing for human-to-machine communications, e.g., when receiving a voice command from a user, e.g., to operate one or more functionalities of mobile device 102 based on one or more voice commands from the user of mobile device 102.

In some demonstrative embodiments, mobile device 102 and 104 may be configured to process acoustic information of a distributed microphone array including at least one microphone 124 of mobile device 102, at least one microphone 154 of mobile device 104, and/or one or more other microphones of one or more other mobile devices belonging to wireless communication network 109, e.g., as described below.

In some demonstrative embodiments, mobile devices 102 and 104 may include personal devices, for example, devices belonging to and/or carried by, a user.

In one example, a user may carry multiple devices, which may have one or more integrated microphones, e.g., cell phones, Smartphones, tablets, laptops, headphones, wearable devices, e.g., a smart watch, smart glasses, a headset, an IoT device, and the like. According to this example, mobile devices 102 and 104 may include personal devices of the same user.

In some demonstrative embodiments, mobile devices 102 and 104 may include personal devices, for example, devices belonging to and/or carried by, the same user.

In one example, mobile device 102 may include a mobile phone, and mobile device 104 may include a mobile computing device, e.g., a laptop, a tablet, a notebook, and the like. In another example, mobile device 102 may include a mobile phone, and mobile device 104 may include a wearable device, e.g., a smart wristwatch, smart glasses, a headset, an IoT device, and the like, e.g., as described below.

According to these examples, mobile device 102 may use microphone 154 of mobile device 104 to improve noise reduction, for example, during a voice call or a voice command conducted by the user of mobile device 102.

In some demonstrative embodiments, mobile devices 102 and 104 may include devices belonging to different users.

In one example, mobile devices 102 and 104, may belong to two or more users, which may be engaged in a conference call, e.g., as described below.

In some demonstrative embodiments, a distributed microphone array formed between microphones of a plurality of mobile devices, e.g., a distributed microphone array including microphones 124 and 154, may have arbitrary, unpredictable and/or non-static characteristics. For example, if mobile devices 102 and 104 communicate as part of an ad-hoc network, relative positions and/or characteristics of the microphones may be unknown, and/or the relative positions and/or characteristics of the microphones may change during use.

The term "position" as used herein with reference to a device may include a location, an orientation, a placement, and/or a rotation of the device. For example, a change in a position of microphone 154 may include a change an orientation, a change in a location, a movement, a rotation, and/or a displacement of microphone 154; and/or a change in a position of microphone 124 may include a change an orientation, a change in a location, a movement, a rotation, and/or a displacement of microphone 124.

In one example, mobile device 102 may include a Smartphone held by a user and mobile device 104 may include a smart wristwatch worn on an arm of the user. According to this example, a relative position between microphones 124 and 154 may change, for example, if the user moves her arm, e.g., during a phone call being conducted by the user via mobile device 102.

In some demonstrative embodiments, a distributed microphone array formed between microphones of a plurality of mobile devices, e.g., a distributed microphone array including microphones 124 and 154, may operate in an arbitrary acoustic environment, e.g., since the mobile devices may be moved between different locations, positions and/or environments.

In some demonstrative embodiments, mobile devices 102 and/or 104 may be configured to process acoustic information of a distributed microphone array including microphone elements, e.g., microphones 124 and/or 154, being at arbitrary and/or dynamic locations, e.g., as described below.

In some demonstrative embodiments, mobile devices 102 and/or 104 may be configured to process acoustic information of one or more arbitrary and/or dynamically-located acoustic sources, for example, one or more speakers moving around a conference room.

In some demonstrative embodiments, a conversation, for example, a teleconference conversation of a user of mobile device 102, especially if held in a "hands-free" mode, may be subject to adverse conditions, and may be corrupted with background noise, interfering signals, room reverberation, and/or any other interferences.

In some demonstrative embodiments, mobile device 102 may include an audio processor 122 configured to determine source information of one or more acoustic sources by processing acoustic information sensed by a distributed microphone array including microphone 124, and one or more other microphone of one or more other mobile devices, for example, microphone 154 of mobile device 104 and/or one or more other microphone of one or more other devices of wireless communication network 109, e.g., as described below.

In some demonstrative embodiments, using the distributed microphone array may enable audio processor 122 to exploit spatial acoustic information sensed by an array of spatially-distributed sensors, e.g., in addition to spectral-temporal information.

In some demonstrative embodiments, the microphone array distributed between devices 102 and 104 may allow audio processor 122 to determine the source information, for example, by application of sophisticated signal extraction algorithms, e.g., without the need to pre-install expensive dedicated audio systems.

In some demonstrative embodiments, using a plurality of mobile devices, e.g., mobile devices 102 and 104, to form the distributed microphone array may increase a probability of maintaining a desired response from the distributed microphone array.

In some demonstrative embodiments, audio processor 122 may receive first acoustic information sensed by microphone 124.

In some demonstrative embodiments, audio processor 122 may include an interface 126 to receive the first acoustic information from microphone 124.

In some demonstrative embodiments, mobile device 104 may include a controller 152 configured to sample second acoustic information sensed by microphone 154, for example, according to a sampling clock 156, e.g., as described below.

In some demonstrative embodiments, mobile device 104 may transmit the second acoustic information to mobile device 102. For example, radio 144 may transmit the second acoustic information to mobile device 102, e.g., via wireless communication network 109.

In some demonstrative embodiments, mobile device 102 may receive the second acoustic information from mobile device 104. For example, radio 114 may receive the second acoustic information, e.g., via wireless communication network 109.

In some demonstrative embodiments, interface 126 may receive the second acoustic information from radio 114.

In some demonstrative embodiments, audio processor 122 may include a processor 128 to determine source information of one or more acoustic sources based on acoustic information of the distributed microphone array formed by microphones 124 and 154. For example, processor 128 may determine the source information based on the first acoustic information sensed by microphone 124, the second acoustic information sensed by microphone 154, and/or other acoustic information sensed by one or more microphones of one or more other mobile devices of network 109, e.g., as described below.

In some demonstrative embodiments, the source information may include voice information of a voice of the user of mobile device 102, e.g., as described below.

Figure 2:
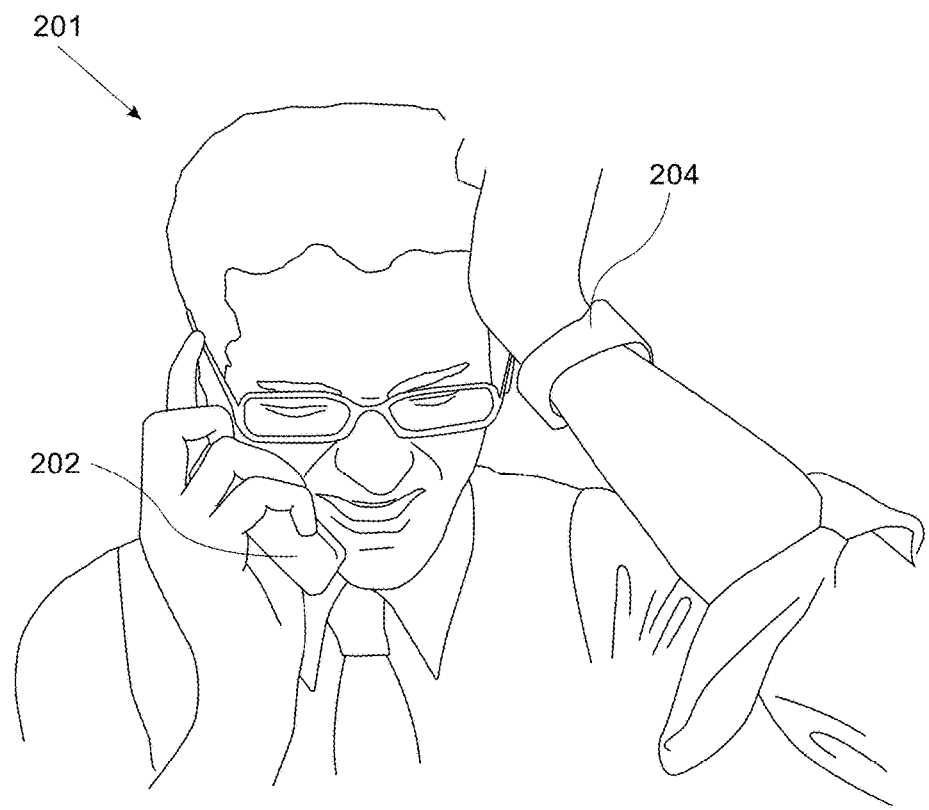
FIG. 2 is a schematic block diagram illustration of a first arrangement of a distributed microphone array, in accordance with some demonstrative embodiments.

Reference is made to FIG. 2, which schematically illustrates a first arrangement of a distributed microphone array, in accordance with some demonstrative embodiments.

In some demonstrative embodiments, a handheld device 202, e.g., a Smartphone, may be held by a user 201, for example, while performing a telephonic conversation and/or during a voice activation mode of device 202, e.g., to enable user 201 to activate and/or control one or more functionalities of device 202. For example, handheld device 202 may perform the functionality of mobile device 102 (FIG. 1).

In some demonstrative embodiments, handheld device 202 may process acoustic information of a distributed microphone array including at least one microphone, e.g., microphone 124 (FIG. 1), of handheld device 202, and at least one microphone, e.g., microphone 154 (FIG. 1), of a wearable device 204, which may be worn by the user 201, e.g., a smart wristwatch, smart glasses, and the like. For example, device 204 may perform the functionality of mobile device 104 (FIG. 1).

In an alternate embodiment, any other mobile devices may provide the functionality devices 202 and/or 204. For example, a headset, smart glasses and/or any other mobile device may perform the functionality of device 202, and/or a smart wristwatch, a Smartphone, a portable computing device, e.g., a laptop, a tablet, and the like, may perform the functionality of device 204.

In some demonstrative embodiments, handheld device 202 may include a processor, e.g., processor 128 (FIG. 1), configured to process first acoustic information sensed by the microphone of handheld device 202, and second acoustic information sensed by the microphone of device 204, to determine source information of a voice of the user 201, for example, to enhance speech quality, e.g., to filter out background noise and/or interference. In one example, the source information may include a voice of user 201 during a phone conversation. In another example, the source information may include the voice of the user 201 captured during a voice activation mode of device 202, e.g., to enable user 201 to activate and/or control one or more functionalities of device 202 based on a voice command from the user 201.

In some demonstrative embodiments, processor 128 (FIG. 1) may be configured to filter out environment noise information from the first acoustic information sensed by device 202, e.g., by microphone 124 (FIG. 1), for example, based on the second acoustic information from device 204, e.g., from microphone 154 (FIG. 1).

In some demonstrative embodiments, device 202 may be held by a first hand of user 201, and device 204 may be worn on a second hand of user 201, e.g., as shown in FIG. 2. In other embodiments, both devices 202 and 204 may be held by and/or worn on the same hand of user 201 and/or any other body part of the user 201, e.g., the head of user 201.

Figure 3:
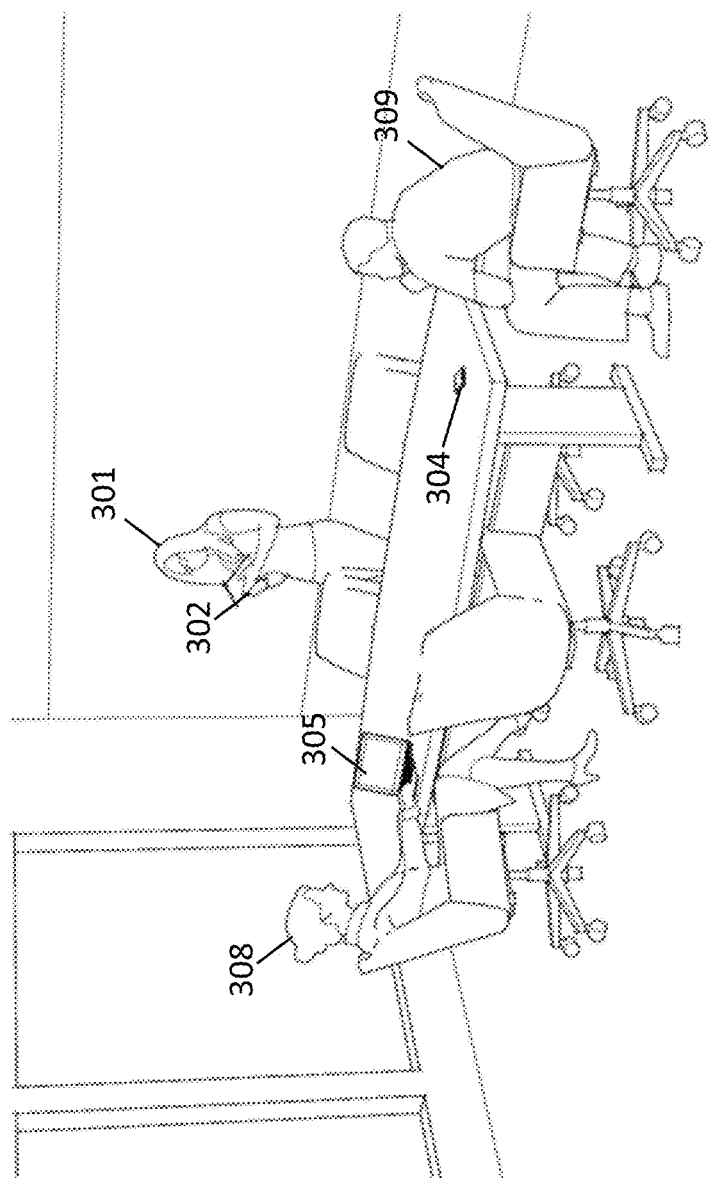
FIG. 3 is a schematic block diagram illustration of a second arrangement of a distributed microphone array, in accordance with some demonstrative embodiments.

Reference is made to FIG. 3, which schematically illustrates a second arrangement of a distributed microphone array, in accordance with some demonstrative embodiments.

In some demonstrative embodiments, a mobile device 302 may include, for example, a computing device, e.g., a tablet, which may be used to capture speech information of a plurality of speakers, e.g., including speakers 301, 308 and 309, participating in a teleconference, e.g., in a conference room. For example, mobile device 302 may perform the functionality of mobile device 102 (FIG. 1).

In some demonstrative embodiments, mobile device 302 may process acoustic information of a distributed microphone array including at least one microphone of mobile device 302, e.g., microphone 124 (FIG. 1), and one or more microphones of one or more other mobile devices, for example, a microphone, e.g., microphone 154 (FIG. 1), of a mobile device 305, e.g., a laptop, and a microphone, e.g., microphone 154 (FIG. 1), of a mobile device 304, e.g., a Smartphone. For example, each of mobile devices 305 and 304 may perform the functionality of a different mobile device 104 (FIG. 1).

In some demonstrative embodiments, mobile device 302 may include a processor, e.g., processor 128 (FIG. 1), configured to process first acoustic information sensed by the microphone of mobile device 302, second acoustic information sensed by the microphone of mobile 305, and third acoustic information sensed by the microphone of mobile 305. For example, processor 128 (FIG. 1) may process the first, second and third acoustic information to determine source information of a voice of speakers 301, 308 and 309, and/or to differentiate between the voices of speakers 301, 308 and 309, for example, to enhance speech quality, e.g., to filter out background noise and/or interference.

For example, processor 128 (FIG. 1) may be configured to filter out environment noise information from the first acoustic information of the microphone of mobile device 302 and/or to differentiate between one speaker and other speakers, e.g., based on the second and third acoustic information from the microphones of devices 304 and 305.

Referring back to FIG. 1, in some demonstrative embodiments it may be assumed that all mobile devices forming the distributed microphone array, and all acoustic sources, e.g., speakers, may be within the same area or space, e.g., a room. According to these embodiments, audio processor 122 may utilize acoustic Multiple-Input-Multiple-Output (MIMO) processing algorithms to identify and track the acoustic sources, for example, to relax requirements for precise positioning of elements of the microphone array, and/or to enable processing of the acoustic information, e.g., even for an ad-hoc distributed microphone array.

In some demonstrative embodiments, the acoustic MIMO algorithms may be trained using an offline and/or online training process for a predefined acoustic environment, e.g., an office, a conference room size, types of noise, noise levels, one or more parameters relating to the dynamic behavior of a noise setting, e.g., onset, changes over time, and the like.

In some demonstrative embodiments, a configuration of the acoustic environment may be defined by at least one mobile device ("smart device"), e.g., mobile device 102, which may have capabilities of sensing the acoustic environment. The smart device may have, for example, memory resources, processor resources and/or cloud access. For example, audio processor 122 may perform one or more environment sensing operations.

In some demonstrative embodiments, the smart device may be capable of performing sophisticated online and/or offline acoustic environment sensing to determine algorithm coefficients for reverberation, types of noise, noise levels, the dynamic behavior of the noise, onset, change over time, and the like.

In some demonstrative embodiments, the smart device may be configured to determine configuration information, e.g., based on the environment sensing, and to propagate the configuration information to one or more other mobile devices, e.g., less-smart devices, of the distributed microphone array. For example, the less-smart devices may perform runtime portion of the acoustic MIMO algorithms, based on the configuration information, e.g., to save computation and/or power resources.

In some demonstrative embodiments, mobile device 102 may inform one or more other mobile devices, e.g., mobile device 104, of the configuration of the acoustic environment. For example, radio 114 may transmit configuration information to radio 144. The configuration information may include information relating to the configuration of the acoustic environment and/or information defining parameters of the second acoustic information to be sent from mobile device 104 to mobile device 102.

In some demonstrative embodiments, the configuration information may define the information be included in the second acoustic information to be transmitted from mobile device 104 to mobile device 102. For example, the configuration information may define one or more parameters and/or coefficients to be included in the second acoustic information.

In one example, mobile device 104 may include a plurality of microphones 154, and the configuration information may define one or more selected microphones from the plurality of microphones. Controller 152 may provide the second acoustic information to include the acoustic information from the one or more selected microphones.

In another example, the configuration information may define one or more processing operations, e.g., to process the acoustic information sensed by microphone 154. For example, the configuration information may define a coefficient matrix and/or any other function to be applied to the acoustic information sensed by microphone 154. According to this example, controller 152 may perform the processing operation on the acoustic information sensed by microphone 154 to generate the second acoustic information to be transmitted to mobile device 102.

In some demonstrative embodiments, using the configuration information may enable mobile device 102 to control and/or manage the acoustic information being transmitted form mobile device 104 to mobile device 102, for example, based on the acoustic environment, the configuration of the distributed microphone array, the type and/or location of acoustic sources, a bandwidth of a wireless communication link between mobile devices 102 and/or 104, and/or any other criterion.

In one example, mobile device 102 may use the configuration information to control mobile device 104 to send to mobile device 102 only part of the acoustic information sensed by microphone 154. Accordingly, mobile device 102 may use the configuration information to manage a reduced bandwidth utilized by the second acoustic information transmitted from mobile device 104 to mobile device 102.

In some demonstrative embodiments, audio processor 122 may implement an acoustic MIMO algorithm using a linearly constrained minimum variance (LCMV) beamformer technique, or any other suitable algorithm or technique, to extract the source information with respect to a defined spatial configuration of the distributed microphone array.

In some demonstrative embodiments, audio processor 122 may perform a training session to initialize the spatial distribution of the microphone array ("the initial spatial configuration"), for example, at a beginning of a time period ("audio session"), during which the source information is to be determined.

In some demonstrative embodiments, a spatial configuration of the distributed microphone array may dynamically change, for example, due to changes in the position of one or more microphones of the microphone array. For example, a spatial configuration of the distributed microphone array formed by microphones 124 and 154 may dynamically change, for example, due to changes in the location of mobile device 102 and/or changes in the orientation of mobile device 104.

In some demonstrative embodiments, the acoustic MIMO algorithm utilized by audio processor 122 may be configured to track acoustic sources, while relative locations between the microphones of the distributed microphone array are arbitrary but static. Accordingly, the acoustic MIMO algorithms may be not be capable of handling situations, in which positions of both the acoustic sources as well as the microphone elements are dynamic. For example, a source extraction technique, which may be configured to handle static microphone arrays, may not be able to properly react to changes in the spatial configuration of the distributed microphone array. For example, acoustic parameters of the microphone array may be significantly affected, e.g., even by small changes in the spatial configuration of the distributed microphone array. For example, simulation results show large differences between acoustic transfer functions of two sources, even if the sources are located at a relatively short distance of 5 centimeters.

In some demonstrative embodiments, audio processor 122 may be configured to dynamically configure the distributed microphone array, for example, upon detection of a change in one or more parameters ("acoustic scene parameters"), which may affect the processing of the acoustic information. For example, audio processor 122 may be configured to dynamically configure the distributed microphone array, for example, upon detection of a change in the acoustic sources, e.g., an added acoustic source, a removed acoustic source, and/or change in the position of one or more acoustic sources; and/or upon detection of a change in the distributed microphone array, e.g., an added microphone element, a removed microphone element, and/or change in the position of one or more microphone elements.

In some demonstrative embodiments, audio processor 122 may be configured to dynamically configure the spatial configuration of the distributed microphone array. For example, audio processor 122 may be configured to dynamically configure the spatial configuration of the distributed microphone array to account for changes in the position of mobile device 102 and/or changes in the position of mobile device 104, e.g., as described below.

In some demonstrative embodiments, mobile device 102 may include at least one position sensor 120 to sense a position of device 102 and/or a change in the position of device 102.

In some demonstrative embodiments, mobile device 104 may include at least one position sensor 150 to sense a position of device 104 and/or a change in the position of device 104.

In some demonstrative embodiments, position sensors 120 and/or 150 may include a gyroscope, an accelerometer, and/or and other device or algorithm configured to sense a change in a position.

In some demonstrative embodiments, processor 128 may be configured to adjust the spatial distribution of the microphone array based on a change in a position of mobile device 102. For example, processor 128 may receive from position sensor 120 information corresponding to a change in the position of mobile device 102, e.g., via interface 126.

In some demonstrative embodiments, processor 128 may adjust the spatial distribution of the microphone array to reflect the change in the position of mobile device 102.

In some demonstrative embodiments, processor 128 may re-align and/or transform acoustic information of the microphone array to the initial spatial configuration of the microphone array, for example, based on a change in the position of mobile device 102, e.g., as described below.

In some demonstrative embodiments, processor 128 may adjust the spatial distribution of the microphone array by applying to the first acoustic information form microphone 124 an acoustic transfer function, which is based on the change in the position of mobile device 102.

In some demonstrative embodiments, processor 128 may apply the acoustic transfer function to the first microphone information, for example, prior to inputting the first acoustic information to the acoustic MIMO algorithm. According to these embodiments, the input to the acoustic MIMO algorithm may be adjusted to reflect the change in the position of mobile device 102, for example, while the acoustic MIMO algorithm may continue using the initial spatial configuration.

In some demonstrative embodiments, mobile device 104 may send position information to mobile device 102. For example, radio 144 may transmit the position information to radio 114. The position information may include information corresponding to the position of device 104.

In some demonstrative embodiments, controller 152 may be configured to send the position information corresponding to the position of device 104, for example, independently of the transmission of the second acoustic information, e.g., even when an audio session is not active and/or when the user of device 102 is speechless.

In some demonstrative embodiments, the position information received from mobile device 104 may include one or more parameters corresponding to the position of mobile device 104, for example, a location fix, a pitch, a yaw, a roll, an acceleration, a speed, a movement distance, and the like.

In other embodiments, the position information may include an indication of a change in the position of mobile device 104, e.g., while including partial information, or not including any specific information regarding the magnitude and/or direction of the change. In one example, radio 144 may transmit to radio 114 a message including an indication, e.g., in the form of a bit, having either a first value, e.g., zero, to indicate no change in the position of mobile device 104, or a second value, e.g., one, to indicate a change in the position of mobile device 104.

In some demonstrative embodiments, radio 114 may receive the position information from mobile device 104, and audio processor 122 may configure the spatial configuration of the distributed microphone array based on the position information, e.g., as described below.

In some demonstrative embodiments, audio processor 122 may be configured to adjust the spatial distribution of the microphone array based on a position change of mobile device 102 and/or a position change of mobile device 104.

In some demonstrative embodiments, processor 128 may be configured to receive the position information corresponding to mobile device 104 from radio 114, e.g., via interface 126.

In some demonstrative embodiments, the position information received from mobile device 104 may include one or more parameters of the position change of mobile device 104, e.g., a change in a location of mobile device 104 and/or a change in an orientation of mobile device 104.

In some demonstrative embodiments, processor 128 may be configured to adjust the spatial distribution of the microphone array based on the parameters. For example, processor 128 may adjust the spatial distribution of the microphone array to reflect the change in the position of mobile device 104.

In one example, the position information from mobile device 104 may include a change in a pitch of mobile device 104 together with a change in a location of mobile device 104. According to this example, processor 128 may adjust the spatial distribution of the microphone array to reflect the change in the pitch and the location of mobile device 104.

In some demonstrative embodiments, processor 128 may re-align and/or transform acoustic information of the microphone array to the initial spatial configuration of the microphone array, for example, based on a change in the position of mobile device 104, e.g., as described below.

In some demonstrative embodiments, processor 128 may adjust the spatial distribution of the microphone array by applying to the second acoustic information form microphone 154 an acoustic transfer function, which is based on the change in the position of mobile device 104. For example, processor 128 may determine the acoustic transfer function based on the change in the pitch and the location of mobile device 104.

In some demonstrative embodiments, processor 128 may apply the acoustic transfer function to the second microphone information, for example, prior to inputting the second acoustic information to the acoustic MIMO algorithm According to these embodiments, the input to the acoustic MIMO algorithm may be adjusted to reflect the change in the position of mobile device 104, for example, while the acoustic MIMO algorithm may continue using the initial spatial configuration.

In some demonstrative embodiments, processor 128 may be configured to trigger a training session to initialize the spatial distribution of the microphone array, for example, if a position of at least one of mobile devices 102 and 104 has changed.

In some demonstrative embodiments, processor 128 may trigger the training session upon detection of a change in the acoustic sources, e.g., an added acoustic source, a removed acoustic source, and/or change in the position of one or more acoustic sources; and/or upon detection of a change in the distributed microphone array, e.g., an added microphone element, a removed microphone element, and/or change in the position of one or more microphone elements In some demonstrative embodiments, processor 126 may receive from position sensor 120, e.g., via interface 120, an indication that the position of mobile device 102 has changed.

In some demonstrative embodiments, processor 128 may receive from radio 114, e.g., via interface 120, the position information indicating that the position of mobile device 104 has changed, e.g., as described above.

In some demonstrative embodiments, processor 128 may trigger the training session responsive to receiving the indication that the position of mobile device 102 has changed and/or the indication that the position of mobile device 104 has changed.

In some demonstrative embodiments, the training session may update the initial microphone configuration to reflect the changes in the position of mobile device 102 and/or mobile device 104.

In some demonstrative embodiments, the acoustic MIMO algorithm may be susceptible to a level of synchronization between the acoustic information sampled from the microphone elements of the distributed microphone array.

In some demonstrative embodiments, mobile devices 102 and 104 may be configured to synchronize between the sampling of acoustic information sensed by microphone 124 and the sampling of acoustic information sensed by microphone 154, for example, to enable audio processor 122 to process synchronized acoustic information of the distributed microphone array.

In some demonstrative embodiments, sampling clock 156 of mobile device 104 may have a time drift with respect to a sampling clock used by mobile device 102 to sample acoustic information from microphone 124.

In some demonstrative embodiments, the first and second acoustic information sensed by microphones 124 and 154 may be synchronized in time, for example, such that performance of a distributed structure beamformer may not be significantly deteriorated over time, e.g., due to the clock drift between sampling clock 156 and audio processor 122.

In some demonstrative embodiments, controller 152 may be configured to dynamically calibrate sampling clock 156 based on the time drift of sampling clock 156, e.g., as described below.

In some demonstrative embodiments, radio 114 may transmit a synchronization frame including a master time stamp. The master time stamp may be generated, for example, according to a clock source of mobile device 102.

In some demonstrative embodiments, processor 128 may synchronize a sampling of the acoustic information of microphone 124 to the time master time stamp.

In some demonstrative embodiments, radio 114 may transmit the synchronization frame as part of, or in the form of, a beacon frame, which may be broadcast over wireless network 109.

In some demonstrative embodiments, radio 114 may transmit the synchronization frame periodically, for example, to enable devices of wireless communication network to periodically acquire and synchronize to the master time stamp.

In some demonstrative embodiments, controller 152 may receive the master time stamp, e.g., from radio 144. For example, controller 152 may control radio 144 to acquire the synchronization frame, e.g., upon first registration with wireless communication network 109, upon waking up from a power save mode, and/or during any other time periods.

In some demonstrative embodiments, controller 152 may determine a time drift of sampling clock 156, e.g., based on the master time stamp.

In some demonstrative embodiments, controller 152 may dynamically calibrate sampling clock 156 based on the time drift, e.g., as described below.

In some demonstrative embodiments, controller 152 may be configured to continuously calibrate sampling clock 156 based on the time drift, for example, until reception of another synchronization frame by radio 144. For example, controller 152 may update the time drift based on a master time stamp of the other synchronization frame.

In some demonstrative embodiments, controller 152 may be configured to continuously calibrate sampling clock 156 based on the time drift, for example, as long as mobile device 104 belongs to wireless communication network 109, e.g., even when mobile device is disconnected form wireless communication network 109, when mobile device 14 and/or radio 144 is operating in a sleep mode, and/or when radio 144 is powered off.

In some demonstrative embodiments, the continuous calibration of sampling clock 156 may enable controller 152 to sample the second acoustic information from microphone 154, e.g., in synchronization with the first acoustic information of microphone 124.

In some demonstrative embodiments, controller 152 may determine the drift of sampling clock 156, for example, based on the master time stamp and a counter of sampling clock 156. For example, the drift, denoted $\sigma$, of sampling clock 156, based on a received master time stamp, denoted Tr, and a time stamp, denoted Tl, of sampling clock 156, e.g., as follows:

$$\sigma = Tl - Tr \qquad (1)$$

In some demonstrative embodiments, controller 152 may dynamically calibrate sampling clock 156, for example, by determining an updated sampling rate, denoted Su, based on a current sampling rate, denoted Sc, and a moving average of the drift σ, e.g., within a moving window of a predefined number, denoted n, master time stamps, e.g., as follows:

$$Su = Sc + \frac{1}{n}\sum_n \sigma \qquad (2)$$

In other embodiments, controller 152 may dynamically calibrate sampling clock 156 based on any other algorithm and/or calculation.

In some demonstrative embodiments, calibrating sampling clock 156 based on the master time stamp from mobile device 102 may enable synchronizing between the second acoustic information sampled by mobile device 104 and the first acoustic information sampled by mobile device 102.

Figure 4:
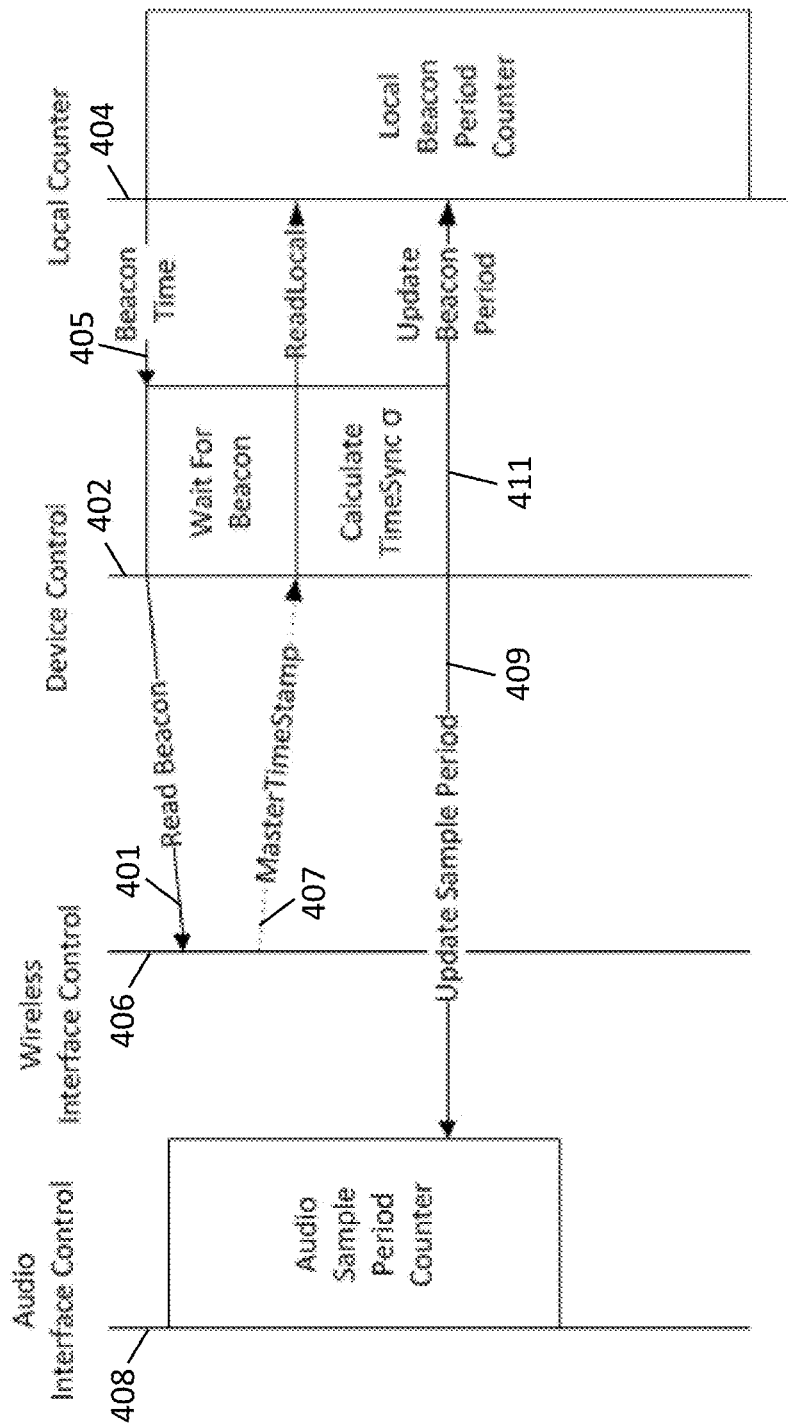
FIG. 4 is a schematic illustration of a sequence diagram of operations performed by a controller to calibrate a sampling clock based on a synchronization frame, in accordance with some demonstrative embodiments.

Reference is made to FIG. 4, which schematically illustrates a sequence diagram of operations performed by a controller 402 to calibrate a sampling clock 408 based on a synchronization frame, in accordance with some demonstrative embodiments. For example, controller 402 may perform the functionality of controller 152 (FIG. 1), and/or sampling clock 408 may perform the functionality of sampling clock 156 (FIG. 1).

In some demonstrative embodiments, a local clock 404 may keep track of a local beacon period. Controller 402 may trigger a radio 406, e.g., radio 144 (FIG. 1), to scan for a beacon (401), e.g., based on a beacon time 405 from local clock 404. Controller 402 may read a master time stamp 407 from the received beacon. Controller 402 may update (409) a sampling rate of sampling clock 408, for example, based on the master time stamp 407, e.g., according to Equation 2. Controller 402 may also update (411) local clock 404 based on master time stamp 207, e.g., to synchronize the local beacon period to the master time tamp 207.

Figure 5:
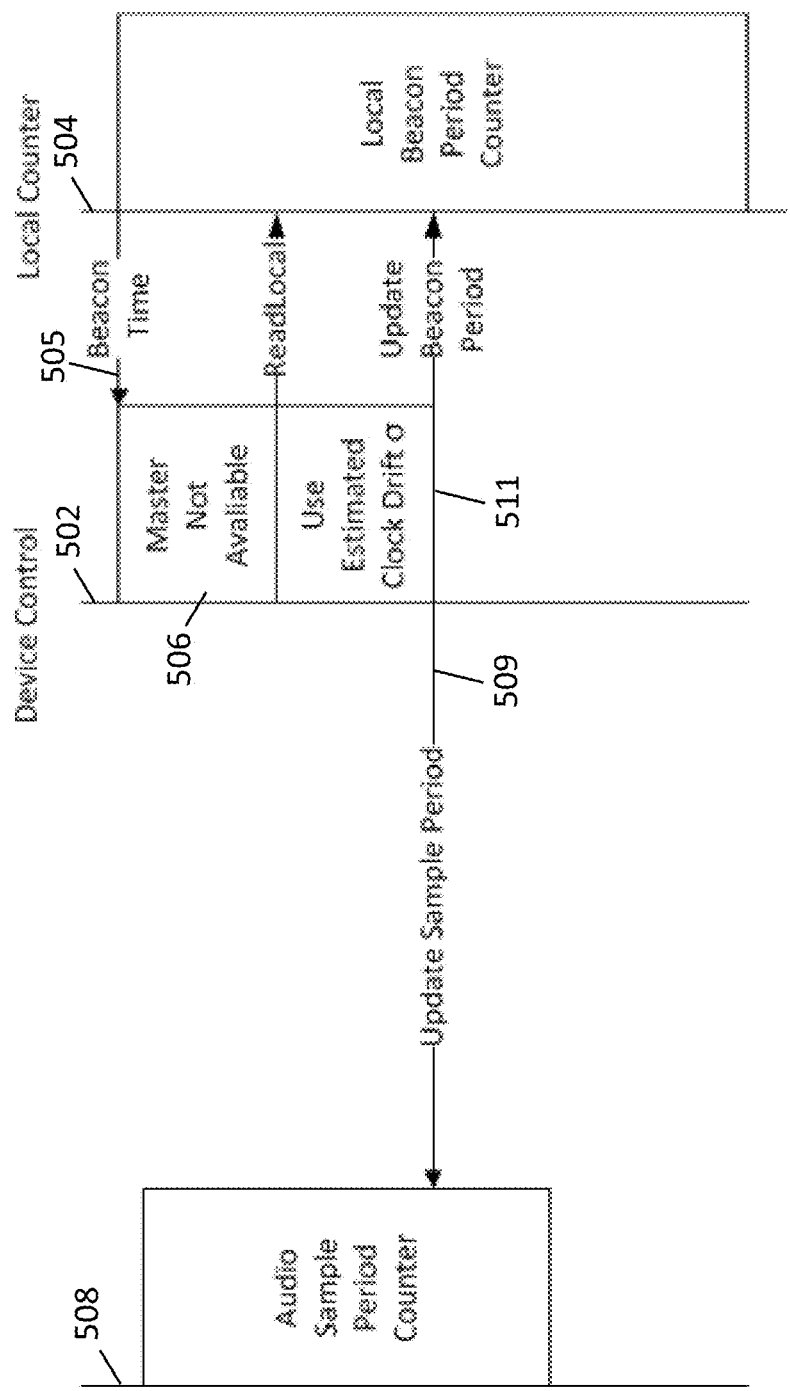
FIG. 5 is a schematic illustration of a sequence diagram of operations performed by a controller to calibrate a sampling clock between synchronization frames, in accordance with some demonstrative embodiments.

Reference is made to FIG. 5, which schematically illustrates a sequence diagram of operations performed by a controller 500 to calibrate a sampling clock 508 between synchronization frames, in accordance with some demonstrative embodiments. For example, controller 502 may perform the functionality of controller 402 (FIG. 4), and/or sampling clock 508 may perform the functionality of sampling clock 408 (FIG. 4).

In some demonstrative embodiments, a local clock 504 may keep track of a local beacon period. Controller 502 may attempt to trigger a radio, e.g., radio 144 (FIG. 1), to scan for a beacon, e.g., based on a beacon time 505 from local clock 504. As shown in FIG. 5, an updated master time stamp may not be available (506), for example, if the radio is powered off and/or in a sleep mode, if a wireless network connection is not available, and/or if a beacon is not receive for any other reason.

In some demonstrative embodiments, controller 502 may update (509) a sampling rate of sampling clock 508, for example, based on the time drift estimated with respect to previously received master time stamps, e.g., as long as a new time stamp is not received. Controller 502 may also update (511) local clock 504 based on the estimated time drift.

Figure 6:
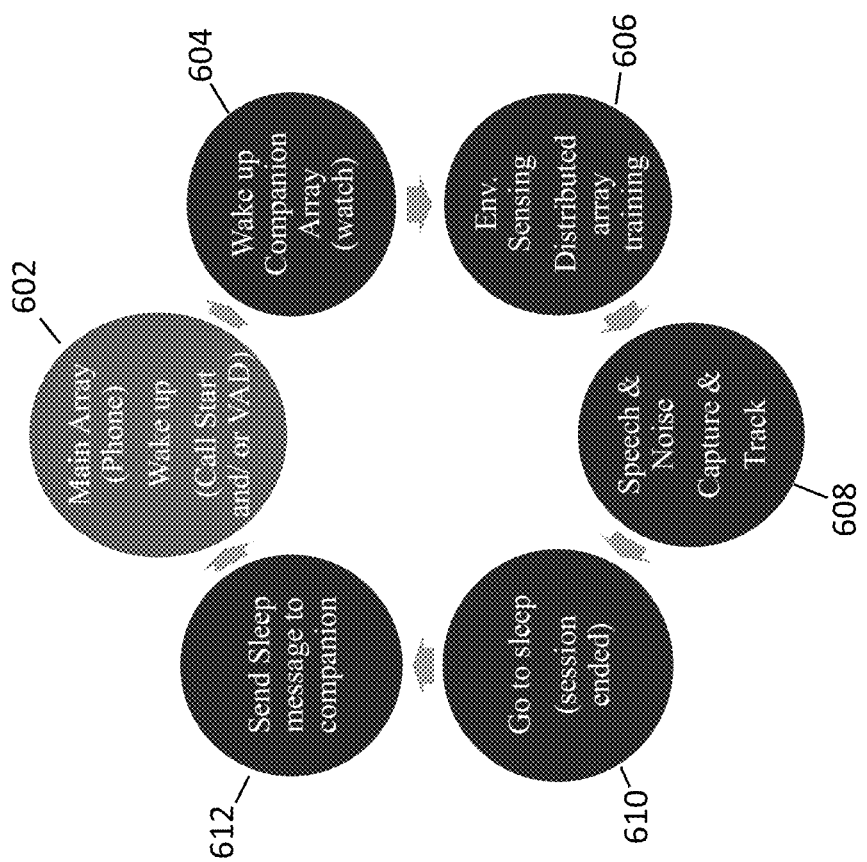
FIG. 6 is a state diagram of a sequence of states of an audio processor, in accordance with some demonstrative embodiments.

Reference is made to FIG. 6, which schematically illustrates a sequence of states of an audio processor, in accordance with some demonstrative embodiments. For example, audio processor 122 (FIG. 1) may operate according to the sequence of states of FIG. 6.

In some demonstrative embodiments, audio processor 122 (FIG. 1) may wake up (602) to start an audio session, e.g., upon voice activity detection (VAD), for example, upon initiation of a phone call by mobile device 102 (FIG. 1) and/or upon initiation of any other operation requiring processing of acoustic information sensed by microphone 124 (FIG. 1).

In some demonstrative embodiments, audio processor 122 (FIG. 1) may send a wake up message (604) to at least one other mobile device, e.g., mobile device 104 (FIG. 1), to operate as a microphone element of a distributed microphone array. For example, audio processor 122 (FIG. 1) may send a wakeup message to mobile device 104 (FIG. 1) to trigger controller 152 (FIG. 1) to send to mobile device 102 (FIG. 1) the second acoustic information sensed by microphone 154 (FIG. 1).

In some demonstrative embodiments, audio processor 122 (FIG. 1) may trigger a training session (606) to sense an acoustic environment and to initialize the configuration of the distributed microphone array, e.g., as described above.

In some demonstrative embodiments, audio processor 122 (FIG. 1) may process (608) acoustic information of the distributed microphone array, e.g., as described above.

In some demonstrative embodiments, audio processor 122 (FIG. 1) may terminate (610) the acoustic session, e.g., based on a command from one or more applications of mobile device 102 (FIG. 1), and/or based upon a VAD indication timeout period that the audio session is to be terminated.

In some demonstrative embodiments, audio processor 122 (FIG. 1) may send a sleep message (612) to the other mobile device, e.g., mobile device 104 (FIG. 1), to terminate operation of the microphone element of the distributed microphone array.

Figure 7:
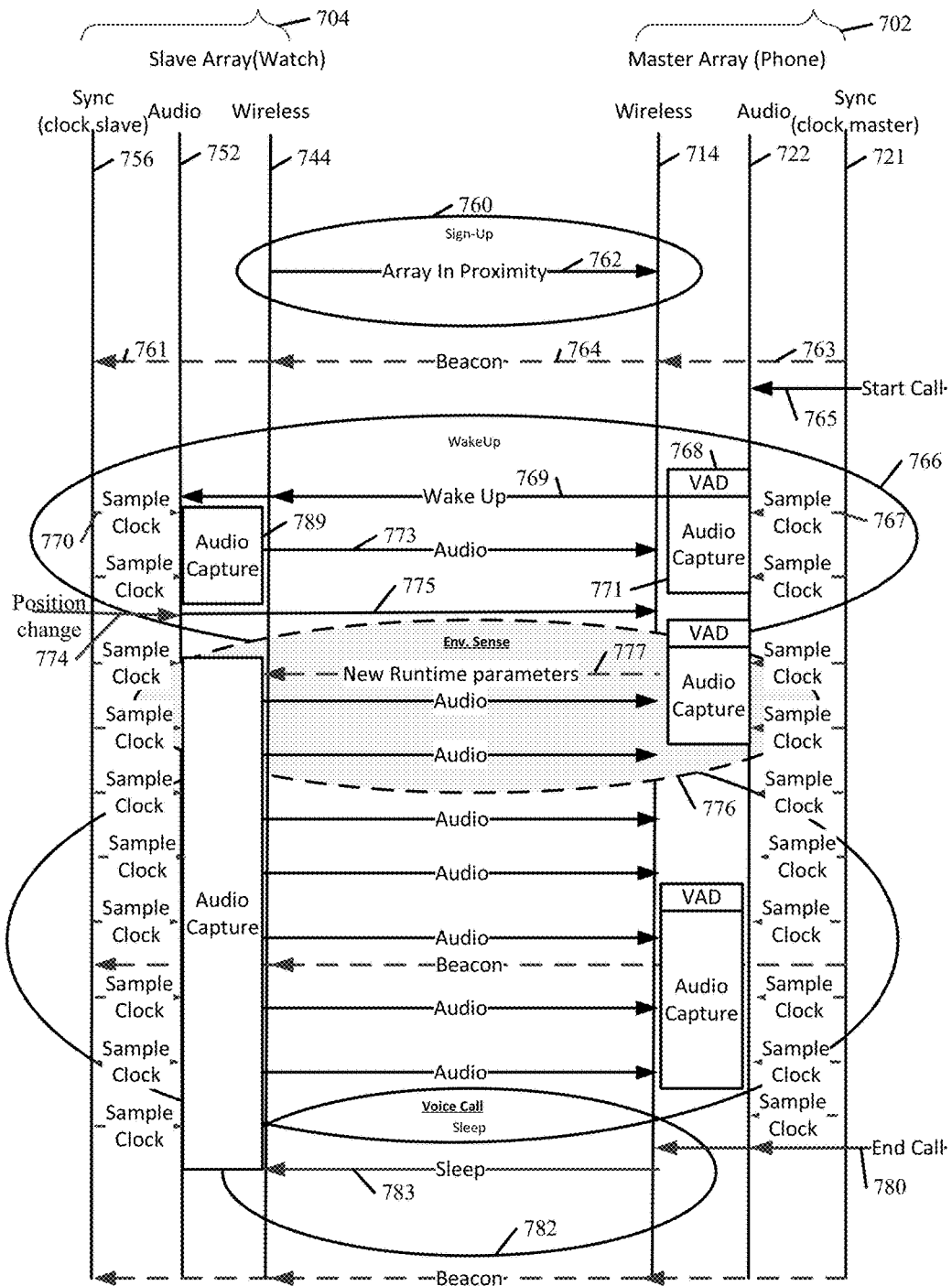
FIG. 7 is a schematic illustration of a sequence diagram of operations performed by first and second mobile devices to communicate acoustic information of a distributed microphone array, in accordance with some demonstrative embodiments.

FIG. 7 is a schematic illustration of a sequence diagram of operations performed by a first mobile device 702 and at least one second mobile device 704 to communicate acoustic information of a distributed microphone array, in accordance with some demonstrative embodiments. For example, mobile device 702 may perform the functionality of mobile device 102 (FIG. 1) and/or mobile device 704 may perform the functionality of mobile device 104 (FIG. 1).

In some demonstrative embodiments, mobile device 702 may perform the functionality of a master of a distributed microphone array, and mobile device 704 may perform the functionality of a slave microphone element of the distributed microphone array.

In some demonstrative embodiments, mobile device 702 may include, for example, an audio processor 722, a radio 714, and a master clock 721. Mobile device 704 may include, for example, an audio controller 752, a radio 744, and a sampling clock ("slave clock") 756. For example, audio processor 722 may perform the functionality of audio processor 122 (FIG. 1), radio 714 may perform the functionality of radio 114 (FIG. 1), audio controller 752 may perform the functionality of controller 152 (FIG. 1), and/or sampling clock 756 may perform the functionality of sampling clock 156 (FIG. 1).

In some demonstrative embodiments, mobile device 704 may sign up with mobile device 702, to operate as part of a distributed microphone array, e.g., during a sign-up state 760. For example, radio 744 may transmit to radio 714 an "array sign up" message, e.g., via any suitable wireless medium.

In some demonstrative embodiments, radio 714 may transmit a sequence of beacons 764, for example, according to a beacon interval, which may be synchronized to a clock signal 763 from master clock 721.

In some demonstrative embodiments, radio 744 may receive beacons 764, and controller 752 may calibrate a clock rate 770 of clock 756 according to a master time stamp of beacons 764.

In some demonstrative embodiments, audio processor 722 may receive an indication 765 of a beginning of an audio session, e.g., a voice call session or a voice command session, which may be initiated for example, by an application of mobile device 702.

In some demonstrative embodiments, audio processor 722 may switch to a wake-up state 766, and may initiate a microphone array training session, for example, upon detection (768) of a speech source, e.g., by a voice activity detector (VAD). Audio processor 722 may also employ acoustic environment sensing, to determine, for example, a reverberation time, types of noise, noise levels, the dynamic behavior of the noise, e.g., onset, changing over time, and/or a room impulse response (RIR) for one or more speakers and one or more interferers.

In some demonstrative embodiments, audio processor 722 may control radio 714 to transmit a wake-up message 769 to mobile device 704.

In some demonstrative embodiments, audio processor 722 may capture audio information 778 sensed by one or more microphones of mobile device 702.

In some demonstrative embodiments, wakeup message 769 may be transmitted over a low-latency wireless connection between mobile devices 702 and 704, e.g., a WiFi connection, a Bluetooth connection, and the like.

In some demonstrative embodiments, wakeup message 769 may trigger mobile device 704 to capture audio information 789 sensed by one or more microphones of mobile device 704. For example, controller 752 may sample the one or more microphones of mobile device 704 according to sample clock 770, which may be synchronized to master clock 763. Controller 752 may control radio 744 to transmit, e.g., to broadcast, audio captured messages 773 including the audio information 789.

In some demonstrative embodiments, audio processor 722 may process the acoustic information 771 captured by mobile device 702 and the acoustic information 789 captured by mobile device 704, e.g., as described above.

In some demonstrative embodiments, audio processor 722 may determine an acoustic environment configuration based on the acoustic information 771 captured by mobile device 702 and the acoustic information 789 captured by mobile device 704.

In some demonstrative embodiments, controller 752 may receive an indication of a position change of mobile device 704, e.g., from position sensor 150 (FIG. 1). Controller 752 may control radio 744 to transmit a position change message 775 to indicate the position change of mobile device 704.

In some demonstrative embodiments, audio processor 722 may receive position change message 775 and may trigger an environment sensing session 776 to initialize the configuration of the distributed microphone array.

In some demonstrative embodiments, audio processor 722 may optionally send to mobile device configuration information 777, corresponding to the initialized configuration of the distributed microphone array, e.g., as described above.

In some demonstrative embodiments, mobile devices 702 and 704 may continue to capture the acoustic information, for example, until receipt of an indication 780 of an end of the audio session, for example, from the application of mobile device 702. For example, mobile device 702 may switch to a sleep state 782, and may transmit a sleep message 783 to mobile device 704.

Figure 8:
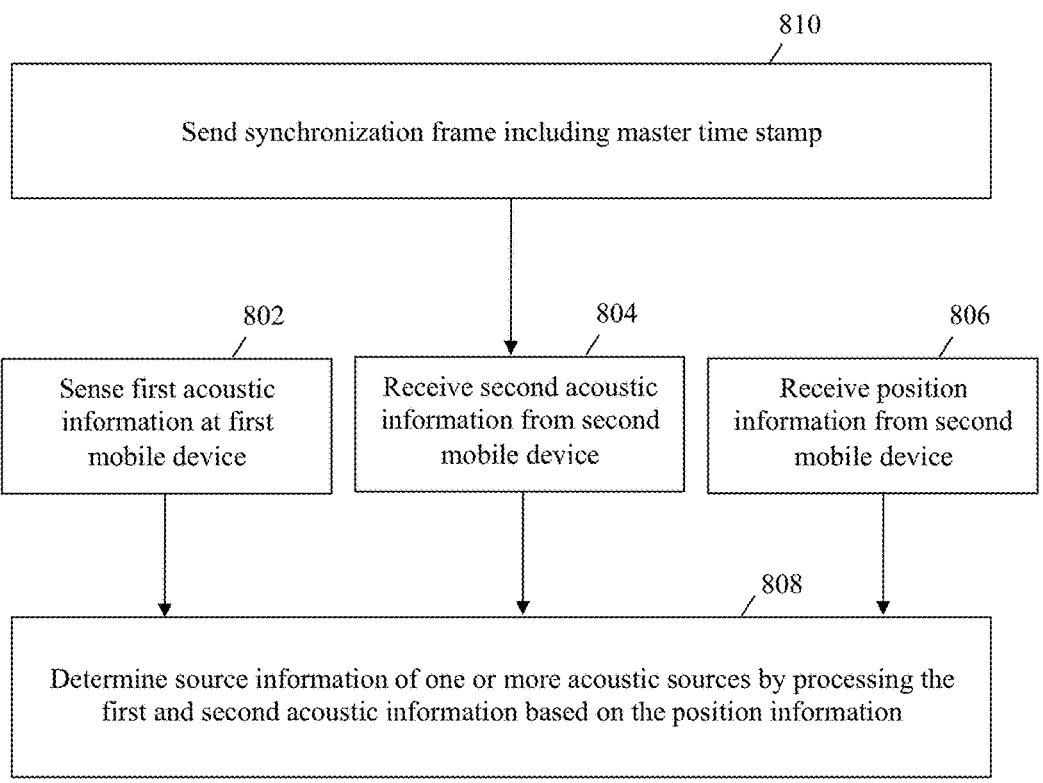
FIG. 8 is a flow-chart illustration of a method of processing audio information of a distributed microphone array, in accordance with some demonstrative embodiments.

FIG. 8 is a flow-chart illustration of a method of processing audio information of a distributed microphone array, in accordance with some demonstrative embodiments. On or more operations of the method of FIG. 8 may be performed, for example, by one or more elements of a system, e.g., system 100 (FIG. 1), a mobile device, e.g., mobile device 102 (FIG. 1) and/or mobile device 104 (FIG. 1), an audio processor, e.g., audio processor 122 (FIG. 1), and/or a controller, e.g., controller 152 (FIG. 1).

As indicated at block 802, the method may include sensing first acoustic information at a first mobile device. For example, audio processor 122 (FIG. 1) may sample first acoustic information of at least one microphone 124 (FIG. 1), e.g., as described above.

As indicated at block 804, the method may include receiving at the first mobile device second acoustic information from a second mobile device via a wireless communication network. For example, audio processor 122 (FIG. 1) may receive second acoustic information of at least one mobile device 104 (FIG. 1) via wireless communication network 109 (FIG. 1), e.g., as described above.

As indicated at block 806, the method may include receiving at the first mobile device position information corresponding to a position of the second mobile device. For example, audio processor 122 (FIG. 1) may receive position information corresponding to the position of mobile device 104 (FIG. 1), e.g., as described above.

As indicated at block 808, the method may include determining source information of one or more acoustic sources by processing the first and second acoustic information based on the position information. For example, audio processor 122 (FIG. 1) may determine source information of one or more acoustic sources, e.g., voice information of the user of mobile device 102 (FIG. 1), based on the acoustic information from microphone 124 (FIG. 1) the acoustic information from microphone 154 (FIG. 1) and the position information from mobile device 104 (FIG. 1), e.g., as described above.

As indicated at block 810, the method may include sending a synchronization frame including a master time stamp, wherein the first acoustic information may be synchronized to the master time stamp. For example, mobile device 102 (FIG. 1) may transmit a beacon including the master time stamp, and controller 152 (FIG. 1) may sample the second acoustic information from microphone 154 (FIG. 1) in synchronization with the master time stamp, e.g., as described above.

Figure 9:
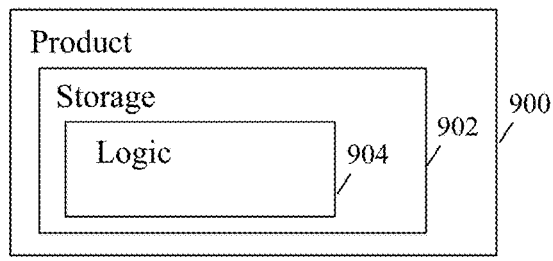
FIG. 9 is a schematic illustration of a product of manufacture, in accordance with some demonstrative embodiments.

Reference is made to FIG. 9, which schematically illustrates a product of manufacture, in accordance with some demonstrative embodiments. Product 900 may include a non-transitory machine-readable storage medium 902 to store logic 904, which may be used, for example, to perform at least part of the functionality of mobile device 102 (FIG. 1), mobile device 104 (FIG. 1), audio processor 122 (FIG. 1), processor 128 (FIG. 1), controller 152 (FIG. 1), and/or to perform one or more operations of the method of FIG. 8. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a first mobile device comprising a first microphone to sense first acoustic information; a radio to communicate with at least one second mobile device via a wireless network, the radio to receive from the second mobile device second acoustic information sensed by at least one second microphone, and position information corresponding to a position of the second mobile device; and an audio processor to determine source information of one or more acoustic sources by processing the first and second acoustic information based on the position information.

Example 2 includes the subject matter of Example 1, and optionally, wherein the audio processor is to configure a spatial distribution of a distributed microphone array including the first and second microphones, based on the position information and a position of the first mobile device, and to process the first and second acoustic information based on the spatial distribution.

Example 3 includes the subject matter of Example 2, and optionally, wherein the audio processor is to adjust the spatial distribution of the microphone array based on at least one change selected from the group consisting of a position change of the first mobile device, and a position change of the second mobile device.

Example 4 includes the subject matter of Example 3, and optionally, wherein the position information includes one or more parameters of the position change of the second mobile device, and wherein the audio processor is to adjust the spatial distribution of the microphone array based on the parameters.

Example 5 includes the subject matter of Example 4, and optionally, wherein the audio processor is to adjust the spatial distribution of the microphone array by applying to the second acoustic information an acoustic transfer function, which is based on the parameters.

Example 6 includes the subject matter of Example 2, and optionally, wherein the audio processor is to trigger a training session to initialize the spatial distribution of the microphone array, if a position of at least one of the first and second mobile devices changes.

Example 7 includes the subject matter of Example 6, and optionally, wherein the position information includes an indication that the position of the second mobile device has changed, and the audio processor is to trigger the training session responsive to the indication.

Example 8 includes the subject matter of any one of Examples 1-7, and optionally, wherein the radio is to transmit a synchronization frame including a master time stamp, and wherein the first acoustic information is synchronized to the master time stamp.

Example 9 includes the subject matter of Example 8, and optionally, wherein the second acoustic information is synchronized with the master time stamp.

Example 10 includes the subject matter of any one of Examples 1-9, and optionally, wherein the source information comprises voice information of a voice of a user of the first mobile device.

Example 11 includes the subject matter of any one of Examples 1-10, and optionally, wherein the audio processor is to filter environment noise information from the first acoustic information, based on the second acoustic information.

Example 12 includes the subject matter of any one of Examples 1-11, and optionally, wherein the wireless network comprises a Wireless Personal Area Network (WPAN).

Example 13 includes the subject matter of any one of Examples 1-12, and optionally, wherein the wireless network comprises an ad-hoc network.

Example 14 includes the subject matter of any one of Examples 1-13, and optionally, comprising one or more antennas; an output unit; a memory; and a processor.

Example 15 includes the subject matter of any one of Examples 1-14 being a handheld device or a wearable device.

Example 16 includes the subject matter of Example 15 being a headset.

Example 17 includes a first mobile device comprising a microphone; a controller to sample acoustic information from the microphone according to a sampling clock; and a radio to receive a synchronization frame from a second mobile device via a wireless network, the synchronization frame including a master time stamp, the radio to transmit the acoustic information to the second mobile device, wherein the controller is to determine a time drift of the sampling clock based on the master time stamp, and to dynamically calibrate the sampling clock based on the time drift.

Example 18 includes the subject matter of Example 17, and optionally, wherein the controller is to continuously calibrate the sampling clock based on the time drift until reception of another synchronization frame, and to update the time drift based on a master time stamp of the another synchronization frame.

Example 19 includes the subject matter of Example 17 or 18, and optionally, wherein the radio is to transmit to the second mobile device position information corresponding to a position of the first mobile device.

Example 20 includes the subject matter of Example 19, and optionally, wherein the position information includes one or more parameters of a change in the position the first mobile device.

Example 21 includes the subject matter of Example 19, and optionally, wherein the position information includes an indication that the position of the second mobile device changes.

Example 22 includes the subject matter of any one of Examples 17-21, and optionally, wherein the radio is to receive an initiation message to initiate an audio capture session, and a termination message to terminate the audio capture session, the radio to transmit the acoustic information during the audio capture session.

Example 23 includes the subject matter of any one of Example 17-22, and optionally, wherein the wireless network comprises a Wireless Personal Area Network (WPAN).

Example 24 includes the subject matter of any one of Examples 17-23, and optionally, wherein the wireless network comprises an ad-hoc network.

Example 25 includes the subject matter of any one of Examples 17-24, and optionally, comprising one or more antennas; an output unit; a memory; and a processor.

Example 26 includes the subject matter of any one of Examples 17-25 being a handheld device or a wearable device.

Example 27 includes the subject matter of any one of Examples 17-26 being a wristwatch.

Example 28 includes an audio processor comprising a processor to determine source information of one or more acoustic sources based on acoustic information sensed by a distributed microphone array including a first microphone of a first mobile device and a second microphone of a second mobile device; and an interface to receive first acoustic information from the first microphone, and to receive second acoustic information and position information from a radio of the first mobile device, the second acoustic information including acoustic information from the second microphone, and the position information corresponding to a position of the second mobile device, wherein the processor is to determine the source information by processing the first and second acoustic information based on the position information.

Example 29 includes the subject matter of Example 28, and optionally, wherein the processor is to configure a spatial distribution of the distributed microphone array, based on the position information and a position of the first mobile device, and to process the first and second acoustic information based on the spatial distribution.

Example 30 includes the subject matter of Example 29, and optionally, wherein the processor is to adjust the spatial distribution of the microphone array based on at least one change selected from the group consisting of a position change of the first mobile device, and a position change of the second mobile device.

Example 31 includes the subject matter of Example 30, and optionally, wherein the position information includes one or more parameters of the position change of the second mobile device, and wherein the processor is to adjust the spatial distribution of the microphone array based on the parameters.

Example 32 includes the subject matter of Example 31, and optionally, wherein the processor is to adjust the spatial distribution of the microphone array by applying to the second acoustic information an acoustic transfer function, which is based on the parameters.

Example 33 includes the subject matter of Example 29, and optionally, wherein the processor is to trigger a training session to initialize the spatial distribution of the microphone array, if a position of at least one of the first and second mobile devices changes.

Example 34 includes the subject matter of Example 33, and optionally, wherein the position information includes an indication that the position of the second mobile device has changed, and the processor is to trigger the training session responsive to the indication.

Example 35 includes the subject matter of any one of Examples 27-34, and optionally, wherein the processor is to provide to the radio a master time stamp, and wherein the first acoustic information is synchronized to the master time stamp.

Example 36 includes the subject matter of Example 35, and optionally, wherein the second acoustic information is synchronized with the master time stamp.

Example 37 includes the subject matter of any one of Examples 27-36, and optionally, wherein the source information comprises voice information of a voice of a user of the first mobile device.

Example 38 includes the subject matter of any one of Examples 27-37, and optionally, wherein the processor is to filter environment noise information from the first acoustic information, based on the second acoustic information.

Example 39 includes a method performed at a first mobile device, the method comprising sensing first acoustic information by a first microphone; receiving from at least one second mobile device via a wireless network second acoustic information sensed by at least one second microphone, and position information corresponding to a position of the second mobile device; and determining source information of one or more acoustic sources by processing the first and second acoustic information based on the position information.

Example 40 includes the subject matter of Example 39, and optionally, comprising configuring a spatial distribution of a distributed microphone array including the first and second microphones, based on the position information and a position of the first mobile device, and processing the first and second acoustic information based on the spatial distribution.

Example 41 includes the subject matter of Example 40, and optionally, comprising adjusting the spatial distribution of the microphone array, based on at least one change selected from the group consisting of a position change of the first mobile device, and a position change of the second mobile device.

Example 42 includes the subject matter of Example 41, and optionally, wherein the position information includes one or more parameters of the position change of the second mobile device, and wherein the adjusting the spatial distribution comprises adjusting the spatial distribution of the microphone array based on the parameters.

Example 43 includes the subject matter of Example 42, and optionally, comprising adjusting the spatial distribution of the microphone array by applying to the second acoustic information an acoustic transfer function, which is based on the parameters.

Example 44 includes the subject matter of Example 40, and optionally, comprising triggering a training session to initialize the spatial distribution of the microphone array, if a position of at least one of the first and second mobile devices changes.

Example 45 includes the subject matter of Example 44, and optionally, wherein the position information includes an indication that the position of the second mobile device has changed, and the triggering comprises triggering the training session responsive to the indication.

Example 46 includes the subject matter of anyone of Examples 39-45, and optionally, comprising transmitting a synchronization frame including a master time stamp, wherein the first acoustic information is synchronized to the master time stamp.

Example 47 includes the subject matter of Example 46, and optionally, wherein the second acoustic information is synchronized with the master time stamp.

Example 48 includes the subject matter of any one of Examples 39-47, and optionally, wherein the source information comprises voice information of a voice of a user of the first mobile device.

Example 49 includes the subject matter of any one of Examples 39-48, and optionally, comprising filtering environment noise information from the first acoustic information, based on the second acoustic information.

Example 50 includes the subject matter of any one of Examples 39-49, and optionally, wherein the wireless network comprises a Wireless Personal Area Network (WPAN).

Example 51 includes the subject matter of any one of Examples 39-50, and optionally, wherein the wireless network comprises an ad-hoc network.

Example 52 includes a method performed at a first mobile device, the method comprising sampling acoustic information from a microphone of the first mobile device according to a sampling clock; receiving a synchronization frame from a second mobile device via a wireless network, the synchronization frame including a master time stamp; determining a time drift of the sampling clock based on the master time stamp; dynamically calibrating the sampling clock based on the time drift; and transmitting the acoustic information to the second mobile device.

Example 53 includes the subject matter of Example 52, and optionally, comprising continuously calibrating the sampling clock based on the time drift until reception of another synchronization frame, and updating the time drift based on a master time stamp of the another synchronization frame.

Example 54 includes the subject matter of Example 52 or 53, and optionally, comprising transmitting to the second mobile device position information corresponding to a position of the first mobile device.

Example 55 includes the subject matter of Example 54, and optionally, wherein the position information includes one or more parameters of a change in the position the first mobile device.

Example 56 includes the subject matter of Example 54, and optionally, wherein the position information includes an indication that the position of the second mobile device changes.

Example 57 includes the subject matter of any one of Examples 52-56, and optionally, comprising receiving an initiation message to initiate an audio capture session, and a termination message to terminate the audio capture session, wherein transmitting the acoustic information comprises transmitting the acoustic information during the audio capture session.

Example 58 includes the subject matter of any one of Examples 52-57, and optionally, wherein the wireless network comprises a Wireless Personal Area Network (WPAN).

Example 59 includes the subject matter of any one of Examples 52-58, and optionally, wherein the wireless network comprises an ad-hoc network.

Example 60 includes a product including one or more tangible computer-readable non-transitory storage media comprising computer-executable instructions operable to, when executed by at least one computer processor, enable the at least one computer processor to implement at a first mobile device a method comprising sensing first acoustic information by a first microphone; receiving from at least one second mobile device via a wireless network second acoustic information sensed by at least one second microphone, and position information corresponding to a position of the second mobile device; and determining source information of one or more acoustic sources by processing the first and second acoustic information based on the position information.

Example 61 includes the subject matter of Example 60, and optionally, wherein the method comprises configuring a spatial distribution of a distributed microphone array including the first and second microphones, based on the position information and a position of the first mobile device, and processing the first and second acoustic information based on the spatial distribution.

Example 62 includes the subject matter of Example 61, and optionally, wherein the method comprises adjusting the spatial distribution of the microphone array based on at least one change selected from the group consisting of a position change of the first mobile device, and a position change of the second mobile device.

Example 63 includes the subject matter of Example 62, and optionally, wherein the position information includes one or more parameters of the position change of the second mobile device, and wherein the adjusting the spatial distribution comprises adjusting the spatial distribution of the microphone array based on the parameters.

Example 64 includes the subject matter of Example 63, and optionally, wherein the method comprises adjusting the spatial distribution of the microphone array by applying to the second acoustic information an acoustic transfer function, which is based on the parameters.

Example 65 includes the subject matter of Example 61, and optionally, wherein the method comprises triggering a training session to initialize the spatial distribution of the microphone array, if a position of at least one of the first and second mobile devices changes.

Example 66 includes the subject matter of Example 65, and optionally, wherein the position information includes an indication that the position of the second mobile device has changed, and the triggering comprises triggering the training session responsive to the indication.

Example 67 includes the subject matter of any one of Examples 60-66, and optionally, wherein the method comprises transmitting a synchronization frame including a master time stamp, wherein the first acoustic information is synchronized to the master time stamp.

Example 68 includes the subject matter of Example 67, and optionally, wherein the second acoustic information is synchronized with the master time stamp.

Example 69 includes the subject matter of any one of Examples 60-68, and optionally, wherein the source information comprises voice information of a voice of a user of the first mobile device.

Example 70 includes the subject matter of any one of Examples 60-69, and optionally, wherein the method comprises filtering environment noise information from the first acoustic information, based on the second acoustic information.

Example 71 includes the subject matter of any one of Examples 60-70, and optionally, wherein the wireless network comprises a Wireless Personal Area Network (WPAN).

Example 72 includes the subject matter of any one of Examples 60-71, and optionally, wherein the wireless network comprises an ad-hoc network.

Example 73 includes a method performed at a first mobile device, the method comprising sampling acoustic information from a microphone of the first mobile device according to a sampling clock; receiving a synchronization frame from a second mobile device via a wireless network, the synchronization frame including a master time stamp; determining a time drift of the sampling clock based on the master time stamp; dynamically calibrating the sampling clock based on the time drift; and transmitting the acoustic information to the second mobile device.

Example 74 includes the subject matter of Example 73, and optionally, wherein the method comprises continuously calibrating the sampling clock based on the time drift until reception of another synchronization frame, and updating the time drift based on a master time stamp of the another synchronization frame.

Example 75 includes the subject matter of Example 73 or 74, and optionally, wherein the method comprises transmitting to the second mobile device position information corresponding to a position of the first mobile device.

Example 76 includes the subject matter of Example 75, and optionally, wherein the position information includes one or more parameters of a change in the position the first mobile device.

Example 77 includes the subject matter of Example 75, and optionally, wherein the position information includes an indication that the position of the second mobile device changes.

Example 78 includes the subject matter of any one of Examples 73-77, and optionally, wherein the method comprises receiving an initiation message to initiate an audio capture session, and a termination message to terminate the audio capture session, and wherein transmitting the acoustic information comprises transmitting the acoustic information during the audio capture session.

Example 79 includes the subject matter of any one of Examples 73-78, and optionally, wherein the wireless network comprises a Wireless Personal Area Network (WPAN).

Example 80 includes the subject matter of any one of Examples 73-79, and optionally, wherein the wireless network comprises an ad-hoc network.

Example 81 includes an apparatus comprising means for sensing first acoustic information by a first microphone of a first mobile device; means for receiving from at least one second mobile device via a wireless network second acoustic information sensed by at least one second microphone, and position information corresponding to a position of the second mobile device; and means for determining source information of one or more acoustic sources by processing the first and second acoustic information based on the position information.

Example 82 includes the subject matter of Example 81, and optionally, comprising means for configuring a spatial distribution of a distributed microphone array including the first and second microphones, based on the position information and a position of the first mobile device, and processing the first and second acoustic information based on the spatial distribution.

Example 83 includes the subject matter of Example 82, and optionally, comprising means for adjusting the spatial distribution of the microphone array based on at least one change selected from the group consisting of a position change of the first mobile device, and a position change of the second mobile device.

Example 84 includes the subject matter of Example 83, and optionally, wherein the position information includes one or more parameters of the position change of the second mobile device, and wherein the adjusting the spatial distribution comprises adjusting the spatial distribution of the microphone array based on the parameters.

Example 85 includes the subject matter of Example 84, and optionally, comprising means for adjusting the spatial distribution of the microphone array by applying to the second acoustic information an acoustic transfer function, which is based on the parameters.

Example 86 includes the subject matter of any one of Examples 82-85, and optionally, comprising means for triggering a training session to initialize the spatial distribution of the microphone array, if a position of at least one of the first and second mobile devices changes.

Example 87 includes the subject matter of Example 86, and optionally, wherein the position information includes an indication that the position of the second mobile device has changed, and the triggering comprises triggering the training session responsive to the indication.

Example 88 includes the subject matter of any one of Examples 81-87, and optionally, comprising means for transmitting a synchronization frame including a master time stamp, wherein the first acoustic information is synchronized to the master time stamp.

Example 89 includes the subject matter of Example 88, and optionally, wherein the second acoustic information is synchronized with the master time stamp.

Example 90 includes the subject matter of any one of Examples 81-89, and optionally, wherein the source information comprises voice information of a voice of a user of the first mobile device.

Example 91 includes the subject matter of any one of Examples 81-90, and optionally, comprising means for filtering environment noise information from the first acoustic information, based on the second acoustic information.

Example 92 includes the subject matter of any one of Examples 81-91, and optionally, wherein the wireless network comprises a Wireless Personal Area Network (WPAN).

Example 93 includes the subject matter of any one of Examples 81-92, and optionally, wherein the wireless network comprises an ad-hoc network.

Example 94 includes an apparatus comprising means for sampling acoustic information from a microphone of a first mobile device according to a sampling clock; means for receiving a synchronization frame from a second mobile device via a wireless network, the synchronization frame including a master time stamp; means for determining a time drift of the sampling clock based on the master time stamp; means for dynamically calibrating the sampling clock based on the time drift; and means for transmitting the acoustic information to the second mobile device.

Example 95 includes the subject matter of Example 94, and optionally, comprising means for continuously calibrating the sampling clock based on the time drift until reception of another synchronization frame, and updating the time drift based on a master time stamp of the another synchronization frame.

Example 96 includes the subject matter of Example 94 or 95, and optionally, comprising means for transmitting to the second mobile device position information corresponding to a position of the first mobile device.

Example 97 includes the subject matter of Example 96, and optionally, wherein the position information includes one or more parameters of a change in the position the first mobile device.

Example 98 includes the subject matter of Example 96, and optionally, wherein the position information includes an indication that the position of the second mobile device changes.

Example 99 includes the subject matter of any one of Examples 94-98, and optionally, comprising means for receiving an initiation message to initiate an audio capture session, and a termination message to terminate the audio capture session, and wherein transmitting the acoustic information comprises transmitting the acoustic information during the audio capture session.

Example 100 includes the subject matter of any one of Examples 94-99, and optionally, wherein the wireless network comprises a Wireless Personal Area Network (WPAN).

Example 101 includes the subject matter of any one of Examples 94-100, and optionally, wherein the wireless network comprises an ad-hoc network.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus for a first mobile device, the apparatus comprising:
    a controller component configured to sample acoustic information from a microphone of the first mobile device according to a sampling clock of the first mobile device; and
    a radio to transmit the acoustic information from the first mobile device to a second mobile device via a wireless network, and to receive from the second mobile device a synchronization frame comprising a master time stamp,
    wherein said controller component is configured to determine a time drift of said sampling clock based on said master time stamp, and to dynamically calibrate said sampling clock based on said time drift.

2. The apparatus of claim 1, wherein said controller component is to calibrate said sampling clock by updating a sampling rate of the sampling clock based on the time drift.

3. The apparatus of claim 2, wherein said controller component is to update the sampling rate of the sampling clock based on a moving average of the time drift over a moving window of a plurality of master time stamps from the second mobile device.

4. The apparatus of claim 1, wherein said controller component is to trigger the radio to scan for a beacon frame comprising said synchronization frame based on a beacon period, the beacon period is according to a local clock of the first mobile device, said controller component to update the local clock based on the master time stamp.

5. The apparatus of claim 1, wherein said controller component is to repeat calibrating said sampling clock based on said time drift until reception of another synchronization frame, and to update the time drift based on another master time stamp in the another synchronization frame.

6. The apparatus of claim 1, wherein said controller component is to repeat calibrating said sampling clock based on said time drift when said radio is in a sleep mode or powered off.

7. The apparatus of claim 1, wherein said controller component is to repeat calibrating said sampling clock based on said time drift when said radio is disconnected from said wireless network.

8. The apparatus of claim 1, wherein said radio is to receive an initiation message to initiate an audio capture session, and a termination message to terminate said audio capture session, said controller component is to trigger the radio to transmit said acoustic information during said audio capture session.

9. The apparatus of claim 1, wherein said controller component is to trigger said radio to transmit to said second mobile device position information representing a position of said first mobile device.

10. The apparatus of claim 1, wherein said synchronization frame comprises a beacon frame.

11. The apparatus of claim 1, wherein said wireless network comprises a Wireless Personal Area Network (WPAN).

12. The apparatus of claim 1, wherein said wireless network comprises an ad-hoc network.

13. The apparatus of claim 1 comprising said microphone and said sampling clock.

14. The apparatus of claim 1 comprising:
    one or more antennas;
    an output unit;
    a memory; and
    a processor.

15. The apparatus of claim 1 comprising a handheld device or a wearable device.

16. The apparatus of claim 1 comprising a wristwatch.

17. A product comprising one or more tangible computer-readable non-transitory storage media comprising computer-executable instructions operable to, when executed by at least one processor, enable the at least one processor to cause a first mobile device to:
    sample acoustic information from a microphone of the first mobile device according to a sampling clock of the first mobile device;
    transmit the acoustic information from the first mobile device to a second mobile device via a wireless network;
    receive from the second mobile device a synchronization frame comprising a master time stamp;
    determine a time drift of said sampling clock based on said master time stamp; and
    dynamically calibrate said sampling clock based on said time drift.

18. The product of claim 17, wherein the instructions, when executed, cause the first mobile device to calibrate said sampling clock by updating a sampling rate of the sampling clock based on the time drift.

19. The product of claim 18, wherein the instructions, when executed, cause the first mobile device to update the sampling rate of the sampling clock based on a moving average of the time drift over a moving window of a plurality of master time stamps from the second mobile device.

20. The product of claim 17, wherein the instructions, when executed, cause the first mobile device to trigger a scan for a beacon frame comprising said synchronization frame based on a beacon period, the beacon period is according to a local clock of the first mobile device, and updating the local clock based on the master time stamp.

21. The product of claim 17, wherein said instructions, when executed, cause the first mobile device to repeat calibrating said sampling clock based on said time drift until reception of another synchronization frame, and to update the time drift based on another master time stamp in the another synchronization frame.

22. The product of claim 17, wherein the instructions, when executed, cause the first mobile device to transmit to said second mobile device position information representing a position of said first mobile device.

23. The product of claim 17, wherein said synchronization frame comprises a beacon frame.

* * * * *